(12) United States Patent
Yano et al.

(10) Patent No.: US 7,810,074 B2
(45) Date of Patent: Oct. 5, 2010

(54) INFORMATION PROCESSING DEVICE, INFORMATION PROCESSING SYSTEM, AND PROGRAM

(75) Inventors: Yoshihiro Yano, Tokyo (JP); Kaoru Ishihira, Tokyo (JP); Satoshi Nakamura, Tokyo (JP); Tatsuya Kakinuma, Tokyo (JP)

(73) Assignee: Dai Nippon Printing Co., Ltd., Shinjuku-ku, Tokyo (JP)

( * ) Notice: Subject to any disclaimer, the term of this patent is extended or adjusted under 35 U.S.C. 154(b) by 1381 days.

(21) Appl. No.: 11/208,554

(22) Filed: Aug. 23, 2005

(65) Prior Publication Data

US 2006/0041944 A1 Feb. 23, 2006

Related U.S. Application Data

(63) Continuation of application No. PCT/JP2004/016936, filed on Nov. 15, 2004.

(30) Foreign Application Priority Data

Nov. 20, 2003 (JP) .............................. 2003-390490

(51) Int. Cl.
*G06F 9/44* (2006.01)
(52) U.S. Cl. ........................................ 717/127; 717/131
(58) Field of Classification Search ........................ None
See application file for complete search history.

(56) References Cited

U.S. PATENT DOCUMENTS 6,175,924 B1 * 1/2001 Arnold ........................ 713/189

6,865,735 B1 * 3/2005 Sirer et al. .................... 717/158

FOREIGN PATENT DOCUMENTS

| JP | 57-127249 | 8/1982 |
|----|-----------|--------|
| JP | 07-110767 | 4/1995 |
| JP | 09-016675 | 1/1997 |
| JP | 09-292989 | 11/1997 |
| JP | 11-024919 | 1/1999 |
| JP | 2000-250872 | 9/2000 |
| JP | 2001-273471 | 10/2001 |
| JP | 2002-049492 | 2/2002 |
| JP | 2002-140127 | 5/2002 |
| JP | 2002-244786 | 8/2002 |
| JP | 2002-304318 | 10/2002 |

* cited by examiner

*Primary Examiner*—Chuck O Kendall
(74) *Attorney, Agent, or Firm*—Bacon & Thomas, PLLC

(57) ABSTRACT

The present invention provides an information processing device, an information processing system, and a program capable of improving security while maintaining convenience to the user. An information processing device 10 includes a magnetic disk 19 which stores application control information including identification information on a file in which an executable application program is stored, such as a file name and a path, and specific information on the file such as a CRC code, and a decision section 111 which decides, when a start request for an application program has been issued, whether or not to permit start of the application program designated by the start request based on the application control information.

15 Claims, 12 Drawing Sheets

INFORMATION PROCESSING DEVICE, INFORMATION PROCESSING SYSTEM, AND PROGRAM

TECHNICAL FIELD

The present invention relates to an information processing device which performs processing according to an application program, an information processing system, and a program executed by the information processing device.

BACKGROUND ART

In recent years, two or more users generally use one computer system accompanying development of a computer utilization technology. However, when unspecified users use one computer system, since information on each user cannot be registered in the computer system in advance, application programs registered in one computer system are limited from the viewpoint of security, whereby convenience is impaired.

An information processing device has been proposed in order to solve this problem (see patent document 1). This information processing device decides whether or not to permit start of an application program by comparing information indicating the position of the user read from an ID card with start control information stored in the information processing device so that many types of application programs can be utilized while maintaining security, even if unspecified users use one computer system.

However, since the invention in the patent document 1 limits the executable program based on the position of each user, when the user installs an unauthorized program and attempts to execute the program, the program is executed, whereby stored data may be damaged or leaked, or the system may be damaged. For example, when a key logger, which is an unauthorized application program, has been installed, this application program is executed irrespective of the user's intention. As a result, information input by operation of a keyboard or the like remains in a log file and is leaked to an unauthorized person.

Moreover, since an employee can download an application program through a communication line, such as the Internet, and execute the downloaded application program, stored data may be destroyed or leaked upon execution of a dangerous program.

Patent document 1: JP-A-9-292989 ([0005] to [0010], FIGS. 1 and 2)

DISCLOSURE OF THE INVENTION

Problems to be Solved by the Invention

An objective of the present invention is to provide an information processing device, an information processing system, and a program capable of improving security while maintaining convenience to the user.

Means for Solving the Problems

The present invention achieves the above objective by the following means. The following means is described using symbols corresponding to embodiments of the present invention so that the present invention is readily understood. However, the present invention is not limited thereto. Specifically, the first invention provides an information processing device (10, 10-2, 10-3), comprising: executable application identification information storage means (19, 19-2, 19-3) for storing executable application identification information including identification information on an executable application program; and execution permission decision means (111, S330, 111-2, S500) for deciding, when a start request for an application program has been issued (S310, S470), whether or not to permit start of the application program designated by the request based on the executable application identification information stored in the executable application identification information storage means.

The second invention provides the information processing device (10, 10-2, 10-3) as defined in the first invention, wherein the executable application identification information storage means stores the identification information on an executable application program of which start is permitted; and wherein the execution permission decision means does not permit start of an application program of which the identification information is not stored in the executable application identification information storage means.

The third invention provides the information processing device (10, 10-2, 10-3) as defined in the first invention, comprising: first initial setting means (114) for performing an initial setting, when a predetermined initial setting request has been issued from a user authenticated as a predetermined person (S160), by writing the executable application identification information into the executable application identification information storage means according to the request.

The fourth invention provides the information processing device (10, 10-2) as defined in the first invention, comprising: measurement means for measuring execution frequency of each application program; and second initial setting means for performing an initial setting by writing the executable application identification information into the executable application identification information storage means based on a measurement result from the measurement means.

The fifth invention provides the information processing device (10, 10-2) as defined in the fourth invention, comprising: setting reservation application identification information storage means (19, 19-2); wherein the second initial setting means writes the identification information on an application program with an execution frequency equal to or greater than a predetermined level into the executable application identification information storage means to allow the application program to be executable, and writes setting reservation application identification information including the identification information on an application program with a medium execution frequency level into the executable application identification information storage means to put the application program in a setting reservation state in which a predetermined person can select whether or not to permit start of the application program.

The sixth invention provides the information processing device (10, 10-2, 10-3) as defined in the first invention, comprising: identification information rewriting means (112) for rewriting, when a predetermined change request has been issued from a user authenticated as a predetermined person (S160'), the executable application identification information stored in the executable application identification information storage means according to the request.

The seventh invention provides the information processing device (10, 10-2, 10-3) as defined in the first invention, wherein the executable application identification information storage means stores the executable application identification information including specific information on an executable application program.

The eighth invention provides the information processing device (10, 10-2, 10-3) as defined in the first invention, comprising: application detection means (112) for detecting a stored application program; and notification means (18) for notifying a predetermined person whether or not the application program detected by the application detection means can be executed based on the executable application identification information stored in the executable application identification information storage means.

The ninth invention provides the information processing device (10, 10-2) as defined in the first invention, comprising: current time information acquisition means for acquiring current time information indicating at least one of current time, date, and day of the week; wherein the executable application identification information storage means stores the identification information on each executable application and corresponding execution time conditions while associating the identification information with the execution time conditions; and wherein, when a start request for an application program has been issued, the execution permission decision means decides whether or not to permit start of the application program designated by the request based on the current time information acquired by the current time information acquisition means and the execution time conditions corresponding to the request target application program.

The tenth invention provides the information processing device (10-2) as defined in the first invention, wherein the executable application identification information storage means stores user conditions while associating the user conditions with the identification information on an executable application program; wherein the information processing device includes user information input means (20) for inputting user identification information and/or user attribute information from outside; and wherein, when a start request for an application program has been issued, the execution permission decision means decides whether or not to permit start of the application program designated by the request based on the user identification information and/or the user attribute information input by the user information input means and the user conditions corresponding to the request target application program.

The eleventh invention provides an information processing system (1), comprising: the information processing device (10-2) as defined in the tenth invention; and a management device (40) which includes user attribute information storage means (46) for storing the user identification information and the user attribute information while associating the user identification information with the user attribute information, and communication means (45) for communicating with the information processing device, and sends the user attribute information corresponding to the user identification information received from the information processing device; wherein the information processing device includes transmission means (16) for transmitting the user identification information input by the user information input means to the management device, and reception means (16) for receiving the user attribute information corresponding to the user identification information transmitted by the transmission means from the management device; and wherein the execution permission decision means of the information processing device makes a decision based on the executable application identification information stored in the executable application identification information storage means and corresponding to the user attribute information received by the reception means.

The twelfth invention provides an information processing system (1), comprising: the information processing device (10-2) as defined in the third invention; and an external device (50) capable of communicating with the information processing device; wherein the external device includes authentication information storage means (52) for storing authentication information, and authentication decision means (51) for deciding whether or not to authenticate the user of the information processing device as the predetermined person based on the authentication information; and wherein the information processing device performs processing in response to an initial setting request and/or a change request from the user when the authentication decision means of the external device has decided "YES".

The thirteenth invention provides a program for execution by an information processing device (10, 10-2) including executable application identification information storage means (19, 19-2) for storing executable application identification information including identification information on an executable application program and performing processing according to an application program, the program comprising: an execution permission decision procedure (S330, S500) for deciding, when a start request for an application program has been issued (S310, S470), whether or not to permit start of the application program designated by the request based on the executable application identification information stored in the executable application identification information storage means.

The fourteenth invention provides the program as defined in the thirteenth invention, comprising: a first initial setting procedure (S220) for performing an initial setting, when a predetermined initial setting request has been issued from a user authenticated as a predetermined person (S160), by writing executable application identification information into the executable application identification information storage means according to the request.

The fifteenth invention provides the program as defined in the thirteenth invention, comprising: a measurement procedure for measuring execution frequency of each application program; and a second initial setting procedure for performing an initial setting by writing the executable application identification information into the executable application identification information storage means based on a measurement result from the measurement procedure.

The sixteenth invention provides the program as defined in the thirteenth invention, comprising: an identification information rewriting procedure (S220') for rewriting, when a predetermined change request has been issued from a user authenticated as a predetermined person (S160'), the executable application identification information according to the request.

Effect of the Invention

According to the information processing device, the information processing system, and the program of the present invention, the following effects can be obtained.

(1) Since whether or not to permit start of an application program is decided based on the executable application identification information when a start request has been issued, an unauthorized application program is prevented from being started, whereby security is improved. Moreover, even if an unauthorized application program is additionally installed, the program is prevented from being started, whereby security is improved.

(2) The initial setting or rewriting of the executable application identification information is performed in response to the request only when a predetermined initial setting request or change request has been issued from a user authenticated as a predetermined person. Therefore, a person who can perform the initial setting or make a change is limited, whereby security can be improved.

(3) An appropriate application program can be made executable by performing the initial setting based on the execution frequency of each application program, whereby burden on the administrator or the like relating to the initial setting is reduced. Moreover, a more appropriate initial setting can be achieved by putting an application program with a medium execution frequency level in a setting reservation state.

(4) Since the executable application identification information including the specific information is stored, an executable application program is reliably identified, such as preventing execution of an unauthorized application program having the same name as the executable application program.

(5) Convenience is improved by detecting the stored application program and notifying a predetermined person whether or not each detected application program can be executed.

(6) The application program start conditions are more finely set by deciding whether or not to permit start of the application program based on the current time information and the execution time conditions, whereby security is improved.

(7) The application program start conditions are more finely set by deciding whether or not to permit start of the application program based on the user conditions, whereby security is improved. This enables registration of various application programs available to each user or user's attribute, such as a management application program which can be executed by only the administrator, whereby convenience and security are improved.

(8) For example, when the user is authenticated as a predetermined person by the external device such as an IC card or a server, processing is performed in response to the request from the user. Therefore, a user who can perform the initial setting and/or make a change of the executable application identification information is limited, whereby security is improved.

EXPLANATION OF SYMBOLS

Figure 1:
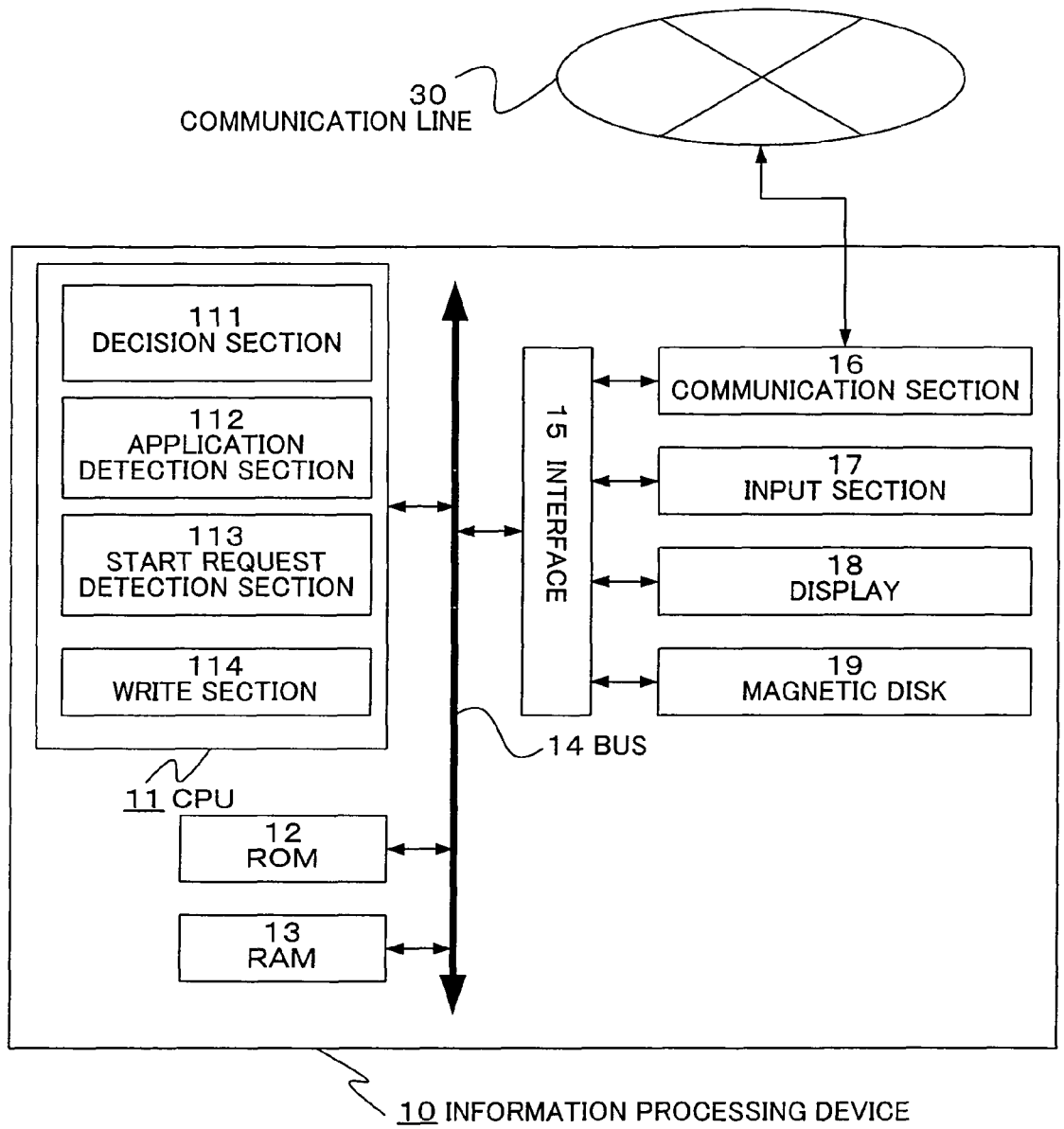
FIG. 1 is a block diagram showing a configuration of an information processing device (first embodiment).

1: Information processing system
10: Information processing device
11: CPU
16: Communication section
19: Magnetic disk
20: R/W
30: Communication line
40: Management device
41: CPU
46: Magnetic disk
50: IC card
51: CPU
52: Memory
111: Decision section
112: Application detection section
113: Start request detection section
114: Write section

BEST MODE FOR CARRYING OUT THE INVENTION

The present invention achieves the objective of improving security while maintaining convenience to the user by providing an information processing device which includes a storage section which stores executable application identification information including identification information and specific information on an executable application program for each attribution of the user, and a decision section which decides, when a start request for an application program has been issued, whether or not to permit start of the application program designated by the request based on the executable application identification information for the attribution corresponding to the user.

First Embodiment

FIG. 1 is a block diagram showing a configuration of an information processing device according to the present invention in a first embodiment.

An information processing device 10 is a computer installed in a company, an Internet cafe, or the like and used by a plurality of predetermined persons or a plurality of unspecified persons. The information processing device 10 is connected with a communication line 30 such as a wired line, such as a telephone line or an optical cable, or wireless communication means such as infrared communication means, and can communicate with another computer by utilizing the Internet or the like.

The information processing device 10 includes a CPU 11, a ROM 12, a RAM 13, and an interface 15 connected with a bus 14, a communication section 16, an input section 17, a display 18, and a magnetic disk 19 connected with the interface 15, and the like.

The ROM 12 is a nonvolatile read-only memory and stores basic software such as an operating system (hereinafter abbreviated as "OS"). The CPU 11 is a central processing unit which performs various types of processing according to the OS stored in the ROM 12 or a program (application program) read from the magnetic disk 19 and loaded into the RAM 13. The RAM 13 is a volatile memory of which data stored therein can be rewritten, and is configured to appropriately store a program, data, or the like necessary for the CPU 11 to perform various types of processing.

The CPU 11 realizes a decision section 111, an application detection section 112, a start request detection section 113, a write section 114, and the like by executing the stored program. The decision section 111 performs various types of decision processing such as an authentication decision or an application execution permission decision (see FIGS. 4 and 5 described later). The application detection section 112 detects an application program accessible by the CPU 11, such as an application program (executable file) stored in the magnetic disk 19. The start request detection section 113 detects an execution request for an application program to the OS issued by input from the input section 17 or from another application program. The write section 114 writes data into a memory region of the magnetic disk 19.

The interface 15 is configured to manage input/output of the communication section 16, the input section 17, the display 18, and the magnetic disk 19. The interface 15 is also connected with the CPU 11, the ROM 12, and the RAM 13 through the bus 14. The communication section 16 is a modem or the like which controls communication with another computer through the communication line 30. The input section 17 includes a keyboard, a mouse, and the like, and is operated by the user when the user inputs various instructions, necessary information, or the like. The display 18 is formed by a CRT, an LCD, or the like, and notifies the user of various types of information by displaying characters, images, or the like.

The magnetic disk 19 is an external storage device such as a hard disk which appropriately stores data, an application program, or the like which must be accessed at a relatively high speed, or a flexible disk or a magneto-optical disk which appropriately stores data, a program, or the like which may be accessed at a low speed in comparison with the hard disk. The magnetic disk 19 stores an application program such as an application program start control program (hereinafter called "application start control program"), a word processing application, or a spreadsheet application, and data necessary for executing the program (application control information or the like). A registered password is stored in the magnetic disk 19. The registered password is authentication information for authenticating the user as an authorized user by comparing the registered password with a password input by the user by operation of the input section 17. The magnetic disk stores two or more types of registered passwords for authenticating authorized users having different attributes, such as a general user and an administrator. The functions of the application start control program are described later using FIGS. 4, 5, and 6.

Figure 2:
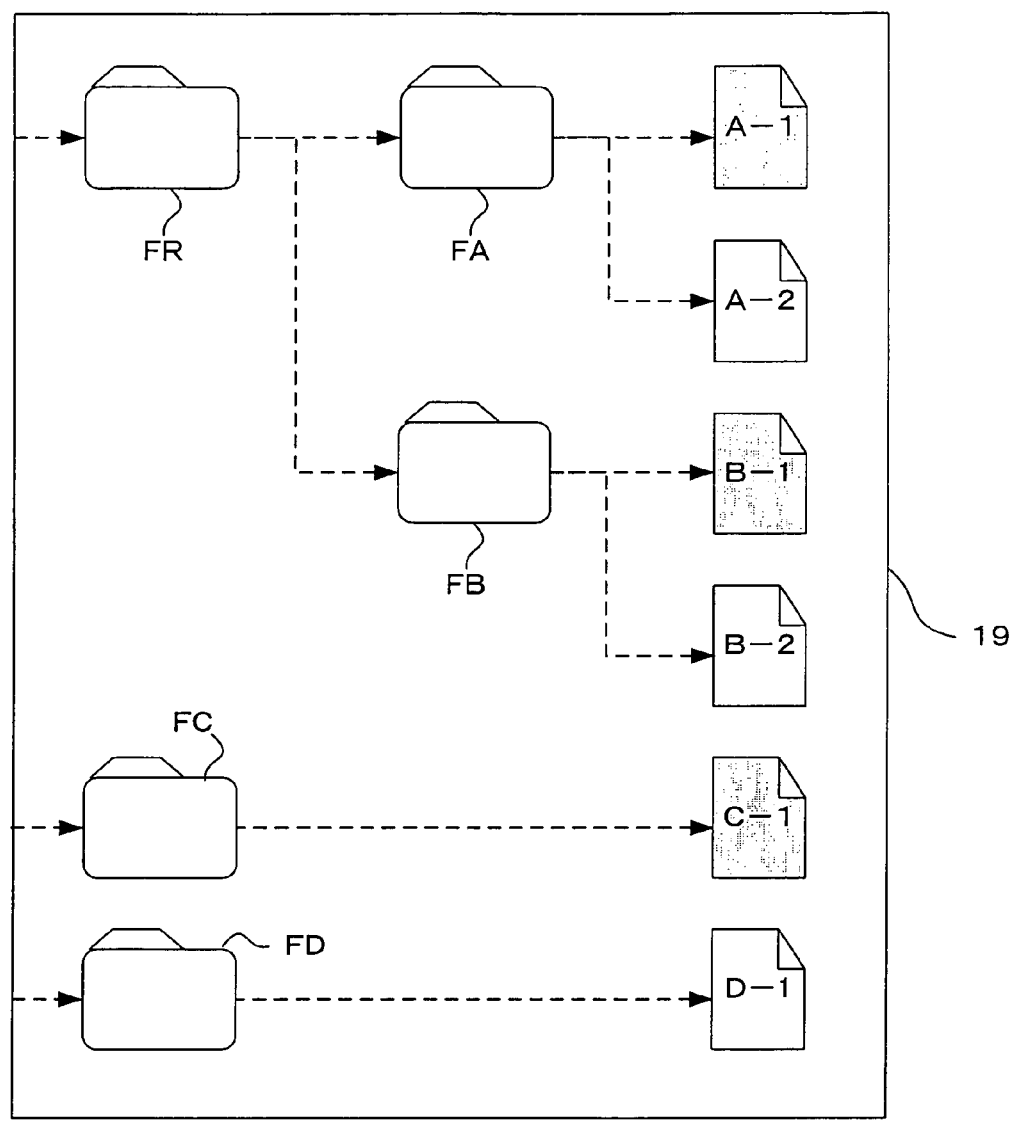
FIG. 2 is a diagram showing a file configuration in a memory region of a magnetic disk 19.
Figure 3:
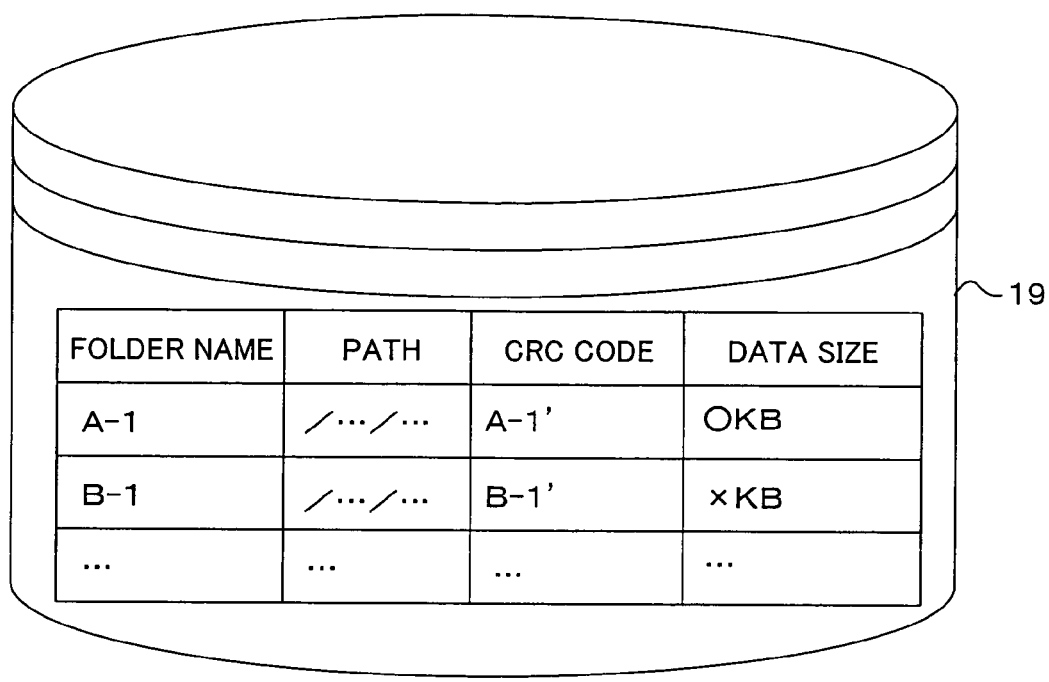
FIG. 3 is a diagram showing application control information stored in a magnetic disk 19 (first embodiment).

FIG. 2 is a diagram showing a file configuration in the memory region of the magnetic disk 19, and FIG. 3 is a diagram showing the application control information stored in the magnetic disk 19.

As shown in FIG. 2, in the memory region of the magnetic disk 19, related files are classified into folders (concept similar to directories) such as in application units, and are stored in a hierarchical structure. An application program and data necessary for executing the program are stored in each file. Each file is assigned a file name for identifying each file at least in the memory region. A file with a file name "X" is hereinafter called a "file X".

As shown in FIG. 3, the magnetic disk 19 stores the application control information. The application control information is executable application identification information including identification information and specific information on an executable application program. In more detail, the magnetic disk 19 stores identification information such as the file name, the path which is location information indicating the location of the file in the magnetic disk 19, the file size, and version information on the application program, and specific information such as the CRC code of the file while associating these pieces of information with each executable file in which the executable application program is stored. The specific information on the file (application program) is one type of identification information and is information specific to that file (application program). The CRC code is a code obtained by performing a predetermined calculation from the content of the file. The CRC code differs if the content of the file differs even in one byte.

In this embodiment, the magnetic disk 19 stores the file name, path, size, CRC code A-1' or B-1', and the like of files A-1 and B-1 among the files A-1, B-1, and C-1 which are executable files (files storing application program and colored in FIG. 2). Files A-2, B-2, and D-1 are files having an attribute other than that of the executable file, such as a text file.

Figure 4:
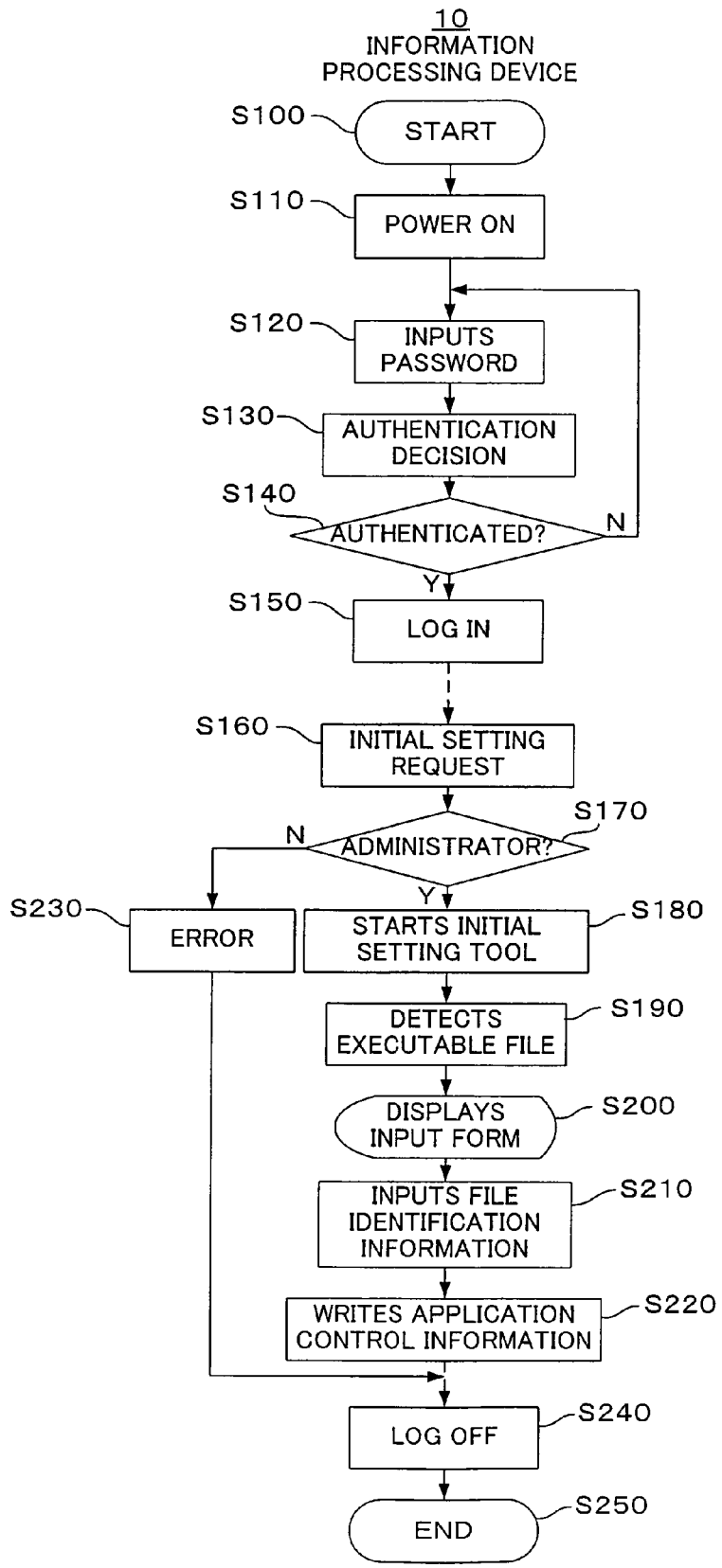
FIG. 4 is a flowchart showing activation of an information processing device and initial setting processing of application control information (first embodiment).

FIG. 4 is a flowchart showing activation of the information processing device and application control information initial setting processing. The following description is given mainly on the processing of the CPU 11 by execution of the application start control program.

In a step S110, the user provides power to the information processing device 10, whereby the information processing device 10 is activated and starts processing. The information processing device 10 displays a password input request on the display 18, and the user inputs a password by operating the input section 17 (S120). The decision section 111 makes an authentication decision as to whether or not to authenticate the user as an authorized user by comparing the input password with the registered password of a general user or an administrator (S130). When the user has not been authenticated, the information processing device 10 maintains a log-off state in which the resources of the information processing device 10 cannot be accessed, such as again requesting the user to input a password (S120). When the user has been authenticated, the information processing device 10 writes the attribute of the authenticated authorized user (administrator, general user, or the like) into the RAM 13, and enters a log-in state in which the resources of the information processing device 10 can be accessed, such as accepting input by the user using the input section 17 (S140 and S150).

The user inputs an initial setting request for requesting start of an initial setting tool using the input section 17 in order to perform an initial setting of the application control information (S160). The decision section 111 decides whether or not the user has been authenticated as the administrator by referring to the information written into the RAM 13 in the step S150 (S170). An error occurs when the user has not been authenticated as the administrator such as when the user is a general user (S230), and the information processing device 10 notifies the user of occurrence of an error by displaying to that effect on the display 18, and does not comply with the initial setting request.

Figure 5:
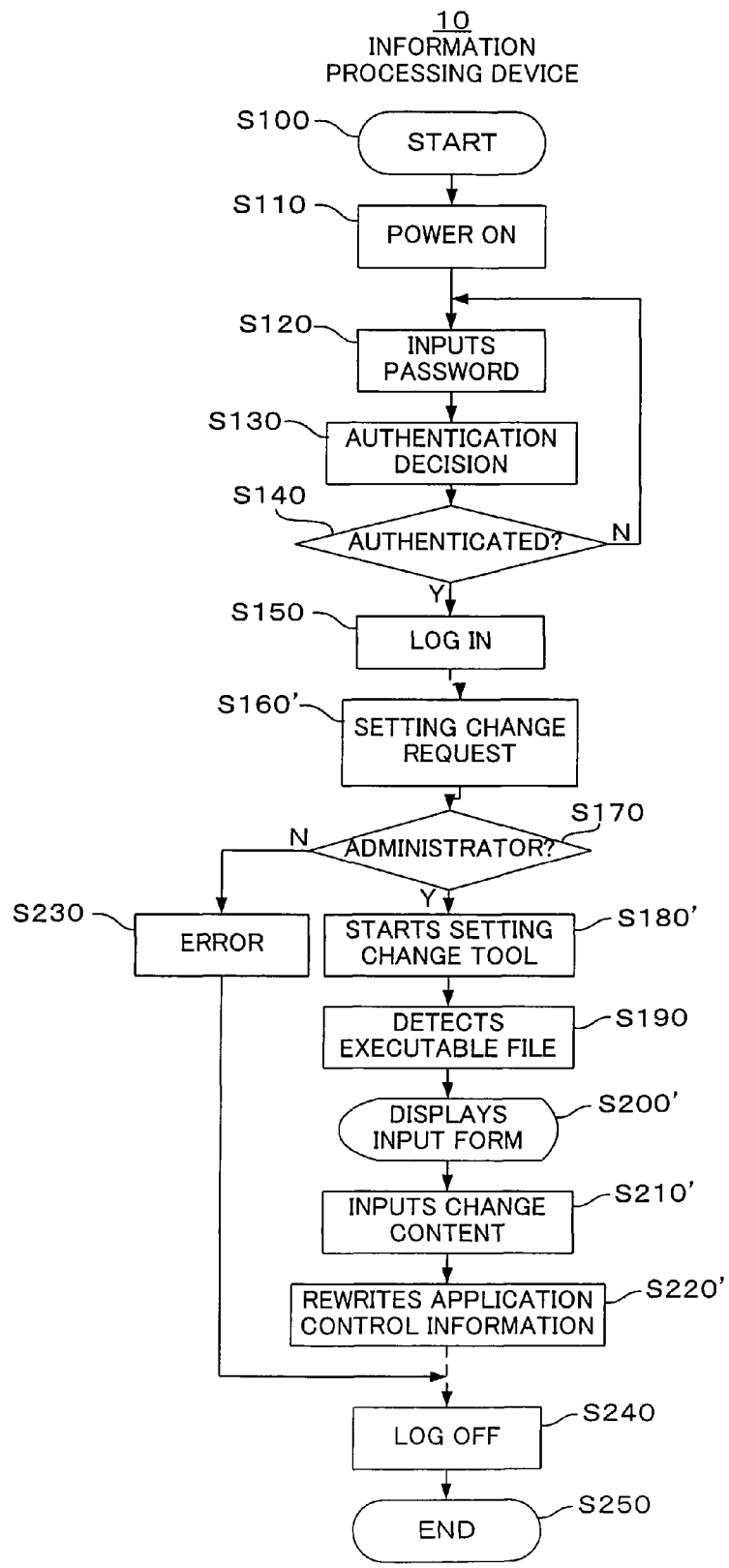
FIG. 5 is a flowchart showing activation of an information processing device and setting change processing of application control information (first embodiment).
Figure 6:
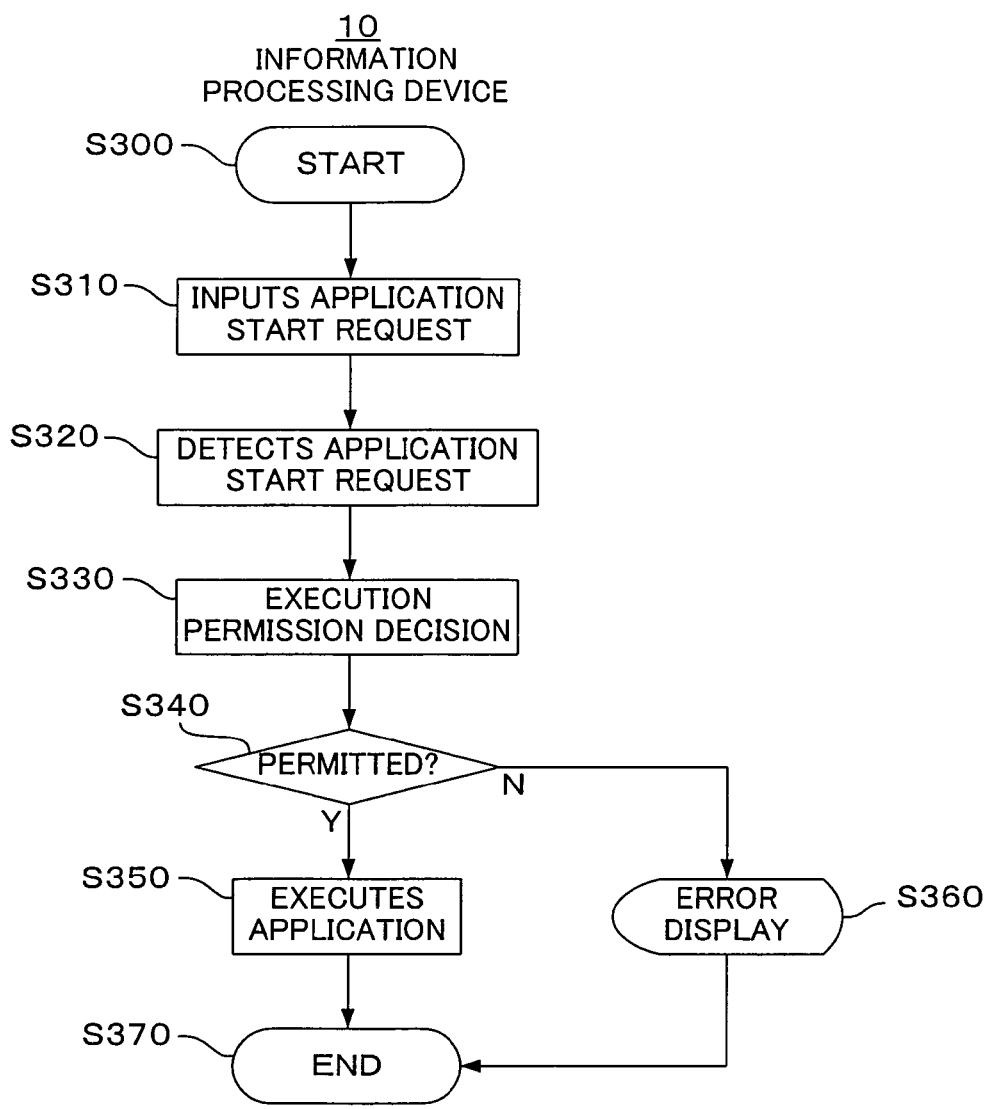
FIG. 6 is a flowchart showing application program start processing of an information processing device (first embodiment).
Figure 9:
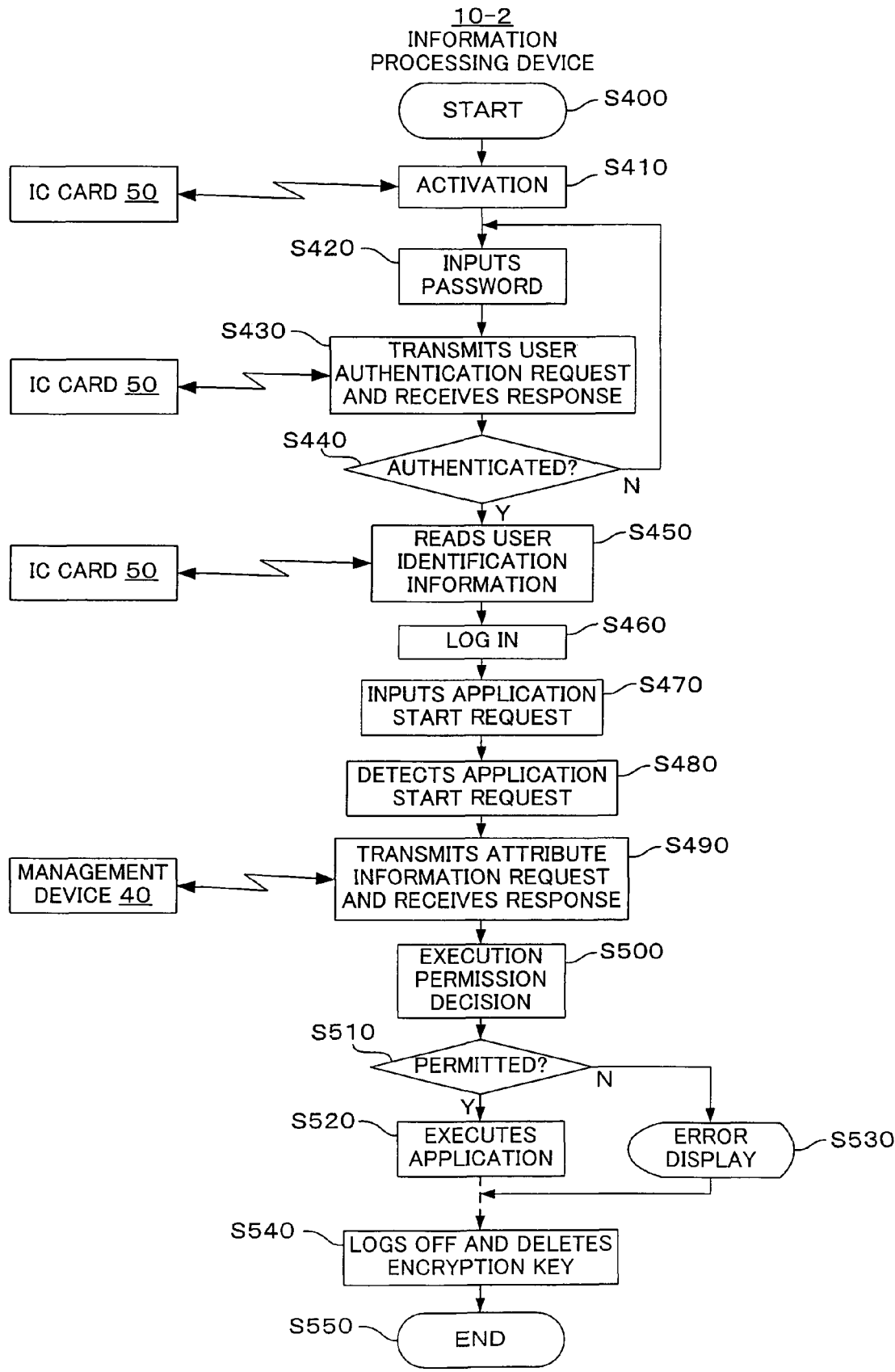
FIG. 9 is a flowchart showing activation of an information processing device and application program start processing (second embodiment).

When an error has occurred (S230), the information processing device 10 may transmit occurrence of an error, user identification information such as the employee's identification number, terminal information such as terminal identification information for identifying the information processing device 10, identification information and specific information on the application program of which start is requested by the user, and the like to a management terminal (not shown) connected with the communication line 30, and the management terminal may manage the received information as audit trail data (this also applies to the step S230 in FIG. 5, step S360 in FIG. 6, and step S530 in FIG. 9).

When the decision section 111 has decided that the user is the administrator, the information processing device 10 starts the initial setting tool (S180). The application detection section 112 detects all executable files stored in the magnetic disk 19 (S190), displays the detected executable files on the display 18 as a list, and requests the administrator to select an executable file which can be executed (or cannot be executed) (S200). The user selects the executable file by operating the input section 17 according to the display on the display 18, and the information processing device 10 inputs the identification information on the executable file which can be executed (S210).

The write section 114 writes the input identification information, other pieces of identification information such as the file size, and specific information such as the CRC code obtained by calculation into the magnetic disk 19 as the application control information to achieve the initial setting (S220). The information processing device 10 then enters a log-off state by the operation by the user (S240), and finishes the initial setting processing (S250).

FIG. 5 is a flowchart showing activation of the information processing device and application control information setting change processing.

When changing (rewriting) the setting of the application control information, such as when installing an additional application program in the information processing device 10 and allowing the application program to be executable, or when disabling execution of an application program which is used at a low frequency, the information processing device 10 performs processing in the same manner as in the initial setting. In FIG. 5, processing the same as the processing in FIG. 4 is indicated by the same symbols, and description of such processing is appropriately omitted.

In a step S160' shown in FIG. 5, the user inputs a setting change request for requesting start of a setting change tool by using the input section 17 in order to change the setting of the application control information. When the user has been authenticated as the administrator (S170), the information processing device 10 starts the setting change tool (S180'). The application detection section 112 detects all executable files stored in the magnetic disk 19 (S190), and the information processing device 10 displays whether or not each detected application program can be executed on the display 18, and requests the administrator to select the setting change target application program (S200').

The user selects the change target application program and the setting by operating the input section 17 according to the display on the display 18, and the information processing device 10 inputs the setting change content (S210'). The write section 114 rewrites the application control information according to the setting change content (S220'). In more detail, when allowing a new application program to be executable, the write section 114 writes the identification information, specific information, and the like on the file in which the new application program is stored into the file control information. When preventing the registered application program from being executed, the write section 114 deletes the information on that application from the file control information.

FIG. 6 is a flowchart showing application program start processing performed by the information processing device. Save processing and read processing are described below in that order mainly on the processing of the CPU 11 by execution of the application control program.

In a step S300, the information processing device 10 is in a log-in state in which power has been supplied to the information processing device 10 and the user has been authenticated (see S110 to S150 in FIG. 4). The user requests start of a target application program, such as a word processing application, by operating the input section 17 (S310).

The start request detection section 113 detects the start request (S320), and the decision section 111 refers to the application control information and makes an execution permission decision as to whether or not to permit start of the target application program based on whether or not the identification information and the specific information on the executable file, in which the start target application program designated by the start request is stored, are included in the application control information (S330).

When the decision section 111 has decided "NO", the information processing device 10 displays occurrence of an error (S340 and S360), and finishes the processing without complying with the request (S370). When the decision section 111 has decided "YES", the information processing device 10 starts and executes the application program designated by the request (S340 and S350), and finishes the application program start processing (S370).

As described above, according to the first embodiment, the information processing device 10 stores the application control information including the identification information on the executable application program, and decides whether or not to permit execution of the application program based on the application control information. That is, only the application program of which the execution is permitted by a predetermined person (administrator) can be executed. Therefore, even if an unauthorized application program (such as a key logger) is additionally installed, since this application program cannot be executed, execution of an unauthorized application program can be prevented, whereby security can be improved.

Since the information processing device 10 performs the initial setting or rewriting of the executable application identification information in response to the request from the user when the information processing device 10 has authenticated the user as the administrator based on the registered password, a person who can perform the initial setting or make a change is limited, whereby security can be improved.

Since the information processing device 10 decides whether or not to permit execution of an application program based on the application control information including the identification information such as the file name and path and the specific information such as the CRC code, the executable application program can be reliably identified, such as preventing execution of an unauthorized application program stored in a file having the same file name as that of the file in which the executable application program is stored.

Moreover, since the information processing device 10 detects the application program stored in the magnetic disk 19 and displays whether or not each application program can be executed on the display 18 to notify a predetermined person such as the administrator to that effect, convenience to the predetermined person can be improved.

Second Embodiment

Figure 7:
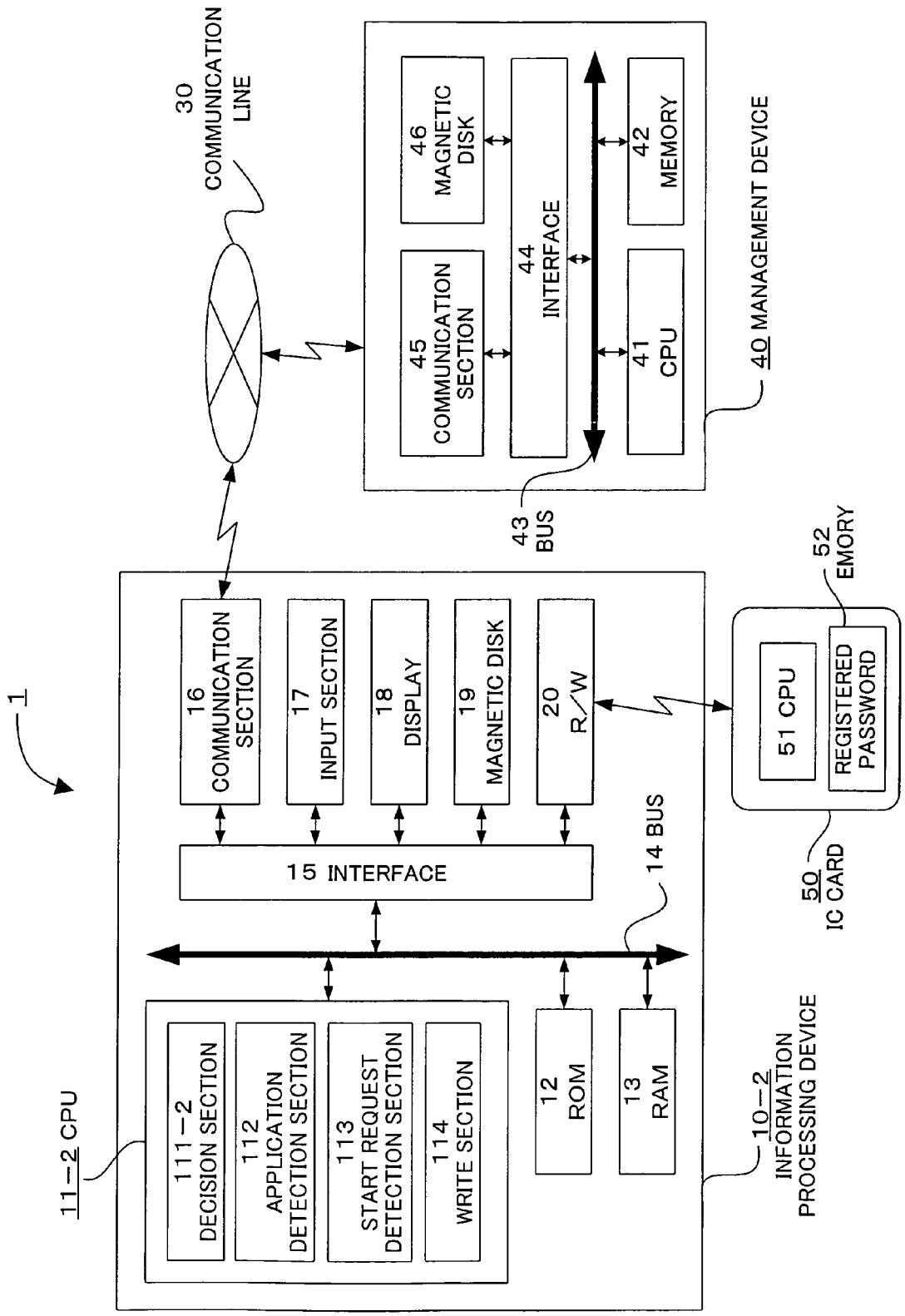
FIG. 7 is a block diagram showing a configuration of an information processing device and an information processing system (second embodiment).

FIG. 7 is a block diagram showing a configuration of an information processing device and an information processing system according to the present invention. Sections having the same functions as those in the first embodiment are indicated by the same symbols, and description of these sections is appropriately omitted.

As shown in FIG. 7, the information processing system 1 includes an information processing device 10-2, a management device 40 connected with the information processing device 10-2 through the communication line 30, and an IC card 50 which can perform contact communication with the information processing device 10-2.

The IC card 50 is a portable information storage medium which includes an IC chip provided in a card substrate and a contact terminal connected with the IC chip (not shown), receives power from an external device such as an R/W 20, and performs contact communication. The portable information storage medium is an information storage medium, such as an IC card or an IC tag, which safely stores predetermined information on the user who carries the information storage medium and from which the information can be read from the outside under predetermined conditions.

The IC chip includes a CPU 51 connected with the contact terminal, and a memory 52 such as a RAM, ROM, or nonvolatile memory. The memory 52 stores user identification information for identifying the user of the IC card 50 (information processing device 10-2), such as an employee's identification number, and a registered password for authenticating whether or not the user of the IC card 50 is an authorized user (owner). The CPU 51 makes an authentication decision as to whether or not to authenticate the user as an authorized user (employee, administrator, or the like) by comparing a password as user input information input by the user through the information processing device 10-2 with the registered password.

The management device 40 is a computer which includes a CPU 41, a memory 42 such as a RAM or ROM, and an interface 44 connected with a bus 43, a communication section 45 and a magnetic disk 46 connected with the interface 44, and the like, and manages the information processing system 1.

The magnetic disk 46 stores user identification information and user attribute information while associating the user identification information with the user attribute information, and the CPU 41 transmits the user attribute information corresponding to the user identification information received from the information processing device 10-2 to the information processing device 10-2. The user attribute information is information indicating the attribute of the user. For example, if the user is an employee of a company, the user attribute information is the position, post, or the like.

The information processing device 10-2 includes the reader/writer (R/W) 20 which controls communication with the IC card 50. The information processing device 10-2 requests the IC card 50 to make an authentication decision on the user, reads the user identification information on the authenticated user from the IC card 50, transmits the user identification information to the management device 40, and receives the user attribute information corresponding to the user identification information.

Figure 8:
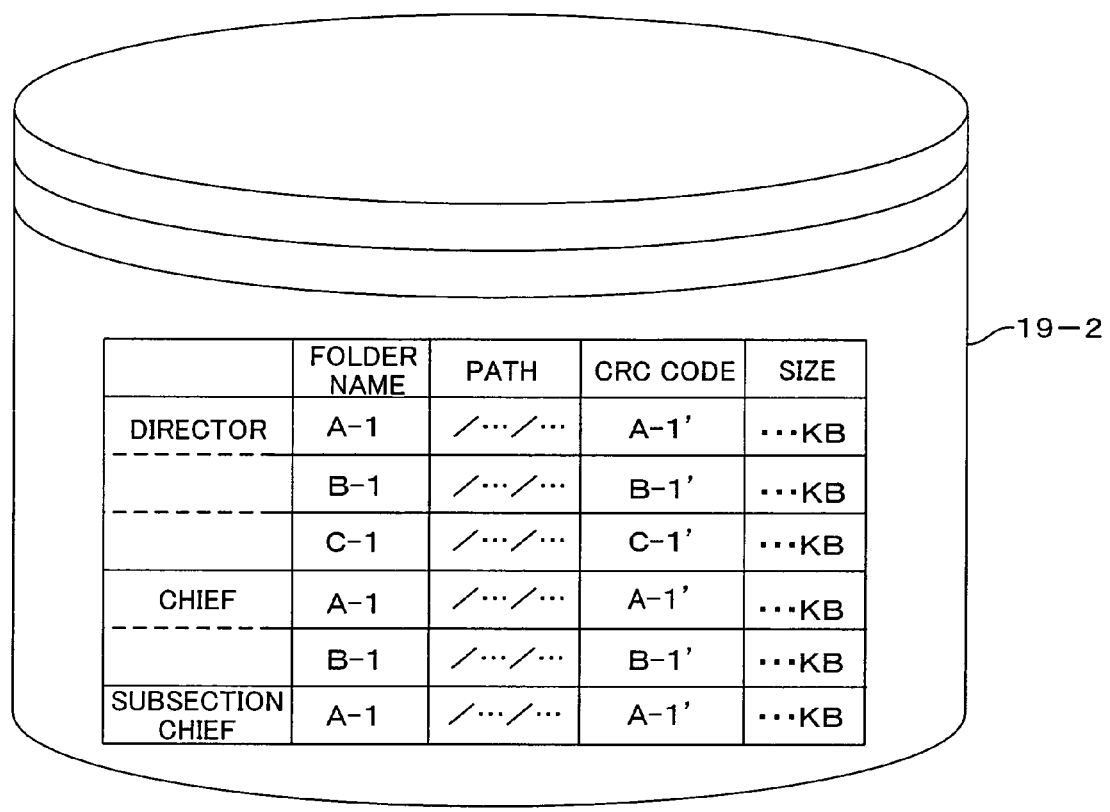
FIG. 8 is a diagram showing application control information stored in a magnetic disk 19-2 (second embodiment).

As shown in FIG. 8, the information processing device 10-2 stores identification information (file name, path, and the like) and specific information (CRC code and the like) on the executable application program and user conditions associated with the identification information in the magnetic disk 19-2 as the application control information. The user conditions are conditions concerning the user necessary for executing an application program. The user conditions include the user attribute information such as the position of the user, the user identification information for identifying a specific person such as the administrator, and the like. A decision section 111-2 makes an execution permission decision by referring to the user conditions for the user attribute information received from the management device 40. A magnetic disk 19-2 may store the user attribute information while associating the user attribute information with each piece of the file identification information in the same manner as in the first embodiment.

FIG. 9 is a flowchart showing activation of the information processing device 10-2 and application program start processing.

In a step S400, the user installs the IC card 50 in the R/W 20 of the information processing device 10-2, and provides power to the information processing device 10-2. The information processing device 10-2 provides a reset signal, power supply, a clock signal, and the like to the IC card 50 to activate the IC card 50 (S410), and the IC card 50 is reset and performs an initial response operation. The information processing device 10-2 displays a password input request on the display 18, and the user inputs a password using the input section 17 (S420). The information processing device 10-2 transmits the input password to the management device 40 and requests authentication, and receives the authentication decision result from the management device 40 as a response (S430). When the user has been authenticated (S440), the information processing device 10-2 reads the user identification information from the IC card 50 (S450), and enters a log-in state (S460).

The information processing device 10-2 performs processing the same as the processing in the steps S310 and S320 in the first embodiment (FIG. 6) in steps S470 and S480, transmits the user identification information read from the IC card 50 in the step S450 to the management device 40 to request the management device 40 to provide the user attribute information, and receives the user attribute information (S490). The decision section 111-2 makes an execution permission decision based on the application control information corresponding to the user attribute information (S500). The information processing device 19-2 then performs processing the same as the processing in the steps S340, S350, S360 (FIG. 6), and S240 (FIG. 4) in the first embodiment according to the decision result, and finishes the processing (S510 to S550).

The information processing device 10-2 performs initial setting and setting change processing in the same manner as in the first embodiment except that the IC card 50 authenticates the administrator (FIGS. 4 and 5).

As described above, according to the second embodiment, in addition to achieving the same effects as in the first embodiment, since the information processing device 10-2 decides whether or not to permit start of the application program according to the user attribute information such as the position, the application program start conditions can be more finely set, whereby security can be improved. Moreover, since various application programs available to the user can be registered in units of the user attribute information, security can be improved while maintaining convenience to the user.

Moreover, it is possible to easily deal with the case where the relationship between the user attribute information and the user identification information is changed, such as the case where the position of the employee is changed, by storing the user attribute information and the user identification information in the management device 40 while associating the user attribute information with the user identification information, whereby convenience can be improved by simplifying the association management.

Furthermore, since the information processing device 10-2 performs processing in response to the request from the user when the IC card 50 has authenticated the user as an authorized user based on the registered password stored with a high degree of safety, security can be improved.

(Modification)

The present invention is not limited to the above-described embodiments, and various modifications and variations may be made. Such modifications and variations are also within the scope of equivalence of the present invention. In each embodiment, the information processing device 10 or 10-2 performs the initial setting of the application control information based on the selection by the administrator. However, the information processing device 10 or 10-2 may perform the initial setting based on the execution frequency measured for each application program instead of the selection by the administrator. In more detail, the information processing device 10 or 10-2 may include an execution frequency measurement section, may measure the execution frequency of each application program stored in the magnetic disk 19 or 19-2, such as the number of executions and the execution time, within a predetermined period (which may be arbitrarily set), may store the execution frequency in the magnetic disk 19 or 19-2, and may write the identification information and the specific information on an application program (file) with an execution frequency equal to or greater than a predetermined level due to a large number of executions and execution time into the magnetic disk 19 or 19-2 after the predetermined period has elapsed to achieve the initial setting of the application control information.

This enables an appropriate application program to be made executable and reduces burden on the administrator or the like relating to the initial setting.

The application programs may be classified into levels corresponding to the measured execution frequency, such as (1) an application program with a high execution frequency level which is executed 100 times or more within one month, (2) an application program with a medium execution frequency level which is executed 5 to 99 times, and (3) an application program with a low execution frequency level which is executed 0 to 4 times. The information processing device 10 or 10-2 may write the identification information and the specific information on the application program (1) into the magnetic disk 19 or 19-2 as the application control information and allow the application program to be executable, and may write the identification information and the specific information on the application program (2) into the magnetic disk 19 or 19-2 as setting reservation application identification information and allow the application program to be in a setting reservation state in which an authorized user such as an employee (may be limited to only the administrator) can arbitrarily select whether or not to permit start of the application program.

A more appropriate initial setting can be achieved by allowing the authorized user or the like to select whether or not to permit execution of the application program with a medium execution frequency level.

In the second embodiment, the information processing device 10-2 reads the user identification information from the IC card 50 after the user has been authenticated as an authorized user at the time of activation (S450 in FIG. 9). However, the read timing of the user identification information is not limited insofar as the timing is after authentication (timing at which accurate user identification information can be read) but before the necessity for the user identification information arises, such as when requesting the management device 40 to provide the user attribute information (S490 in FIG. 9).

In each embodiment, the information processing device 10 or 10-2 stores the application control information (executable application identification information) including the specific information on the file (application program) such as the CRC code. However, the specific information on the application program is not limited thereto. It suffices that the specific information be information specific to one application program (executable file), such as a hash value of the application program. This also applies to the identification information such as the path. It suffices that the identification information be information for identifying one application program from another application program.

In each embodiment, the information processing device 10 or 10-2 writes the identification information, such as the file name, path, file size, and version information on the application program, and the specific information such as the CRC code on the file which is made executable into the magnetic disk 19 as the application control information during the initial setting or setting change of the application control information. However, the information processing device 10 or 10-2 may request the administrator to select whether or not to write the size and the CRC code of the file which may be frequently updated depending on the application program, and may write the application control information according to the selection by the administrator.

For example, when allowing an application program which is frequently updated to be executable, the application program can be prevented from becoming unexecutable due to rewriting of the specific information during updating by writing neither the size nor the CRC code of the file as the application control information.

In each embodiment, the information processing device 10 or 10-2 stores the application control information. However, the information processing device 10 or 10-2 may receive the application control information from a predetermined server such as the management device 40 through the communication line 30, may store the received application control information in the RAM 13 or the like, and may utilize the stored application control information for processing. It suffices that the application control information be stored in the information processing device 10 or 10-2 at least when the execution permission decision (S330 in FIG. 6 and S500 in FIG. 9) or the like is required. The storage period and the storage location of the application control information in the information processing device 10 or 10-2 are not particularly limited.

The application control information may be divided and separately stored at a plurality of predetermined locations such as a plurality of servers. The application control information may be divided and separately stored at a plurality of predetermined locations so that effective information is not obtained unless the divided pieces of application control information are collected and processed using a predetermined method. This prevents leakage of the application control information.

In each embodiment, the user who can perform the initial setting and setting change of the application control information is limited to the administrator. However, the present invention is not limited thereto. It is possible to arbitrarily set the authority given to each user.

In each embodiment, when storing a new application program in the magnetic disk 19 or 19-2 of the information processing device 10 or 10-2, the application detection section 112 detects the application program stored in the magnetic disk 19 or 19-2 and changes the application control information. However, the application detection section 112 may set the application control information only on the file in which the new application program is stored without detecting the application programs. This reduces time necessary for the detection processing, whereby the processing speed can be increased.

In the first and second embodiments, the information processing device 10 and the IC card 50 respectively authenticate the user. However, the management device 40 may manage the registered password while associating the registered password with the user identification information, and may authenticate the user based on the password input through the information processing device 10 and the registered password. A device which authenticates the user is not limited insofar as the user can be authenticated as an authorized user.

In the first embodiment, the information processing device 10 may store the user identification information and the user attribute information in the magnetic disk 19 while associating the user identification information with the user attribute information, may store the application control information in which the identification information and the specific information on the executable application program are associated with each piece of user attribute information, and may limit an available application program based on the user identification information input by the user. This enables various application programs available to the user to be registered in units of user attribute information, whereby convenience to the user can be improved.

In the second embodiment, the information processing system 1 includes the IC card 50 as the portable information storage medium. However, the information processing system 1 may include another portable information storage medium having a similar function, such as an IC tag.

In the second embodiment, the IC card 50 and the R/W 20 of the information processing device 10 perform contact communication. However, the IC card 50 and the R/W 20 may perform non-contact communication. The communication method is not limited.

Figure 10:
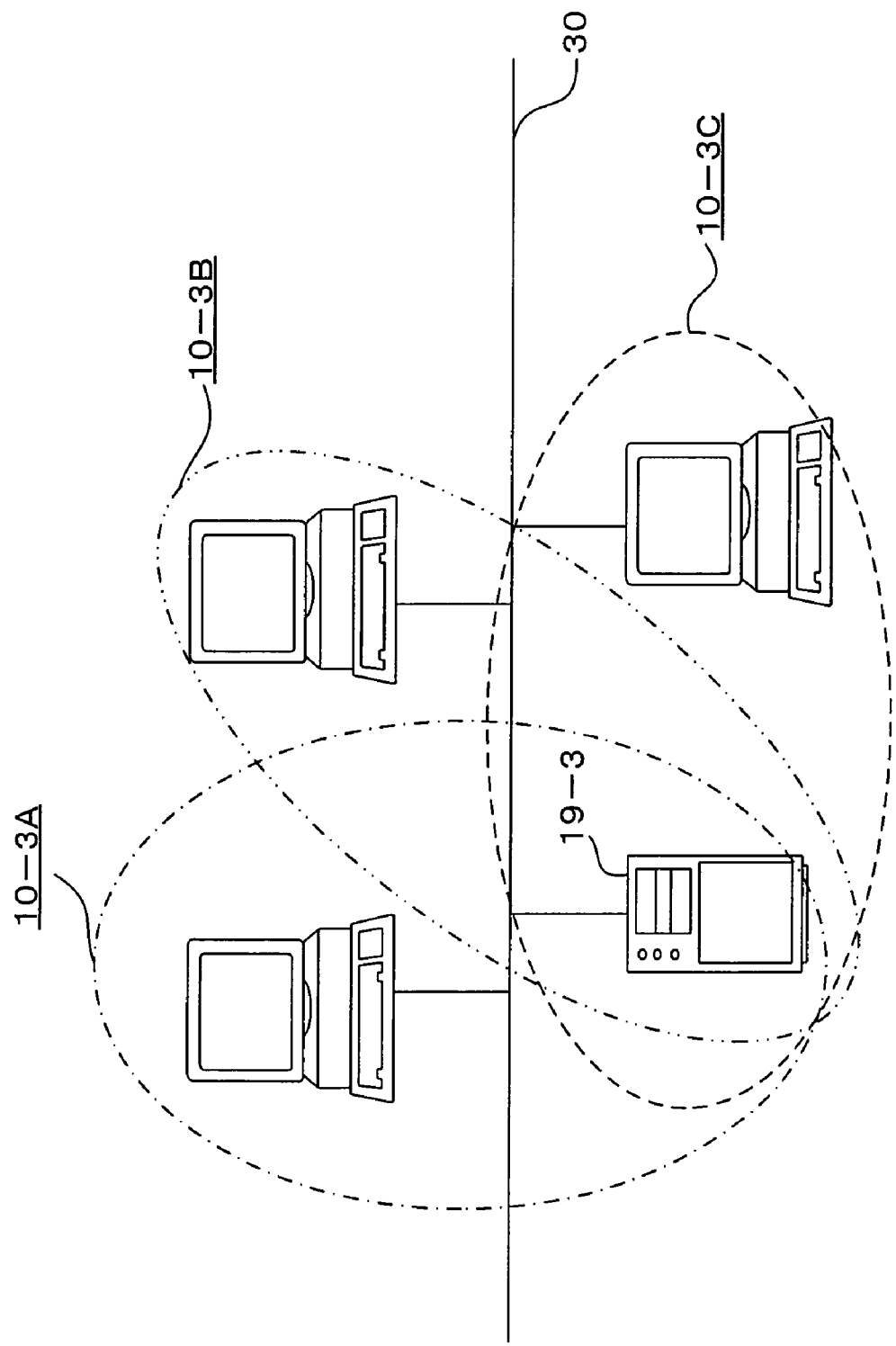
FIG. 10 is a block diagram showing a configuration of an information processing device (modification).

As shown in FIG. 10, an information processing device 10-3 (10-3A, 10-3B, or 10-3C) may include a computer 10'-3 (10'-3A, 10'-3B, or 10'-3C), and a storage device 19-3, which is connected with the computer 10'-3 through a communication line 30-3 such as an in-house LAN or the like and stores an application program or the like, instead of the magnetic disk 19 or 19-2 in the first or second embodiment. The computer 10'-3 is a computer having a configuration similar to that of the information processing device 10 or 10-2 and capable of performing communication through the communication line 30-3. The storage device 19-3 is also a computer having the same configuration. When a start request for an application program stored in the storage device 19-3 is issued from the user, the computer 10'-3 makes an execution permission decision based on application start control information in the same manner as the information processing device 10 or 10-2 in each embodiment.

This enables the application program stored in the storage device 19-3 to be used in common while maintaining security, whereby convenience can be improved.

Figure 11:
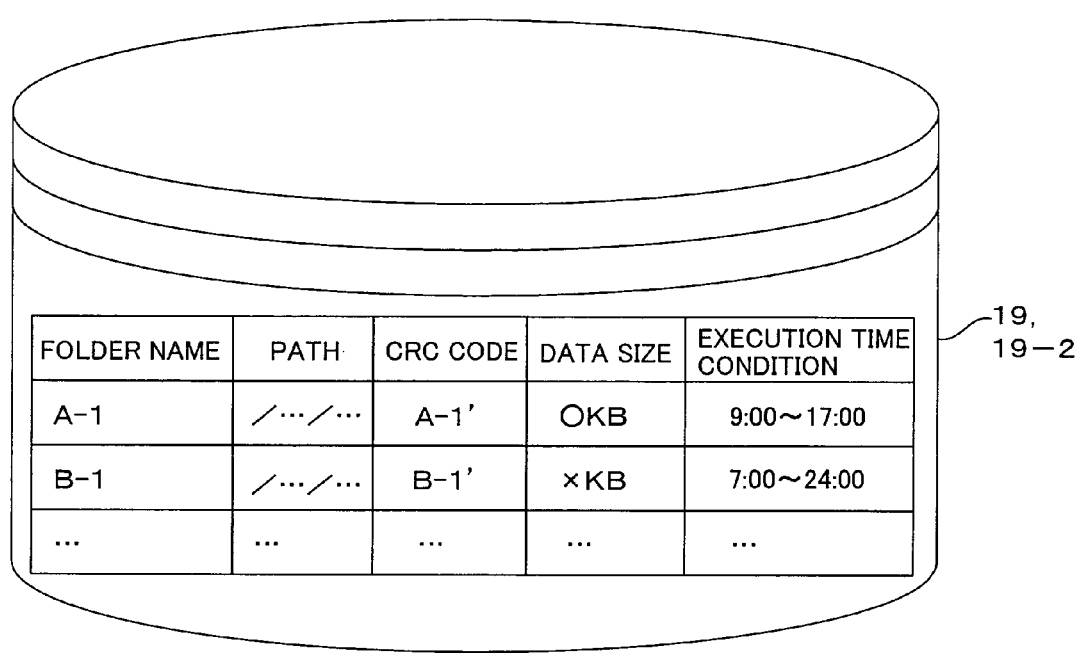
FIG. 11 is a diagram showing application control information stored in a magnetic disk 19 or 19-2 (modification).

FIG. 11 is a diagram showing the application control information stored in the magnetic disk 19.

The information processing device 10 or 10-2 may include a current time information acquisition section such as a clock, and may store the application control information, in which execution time conditions are associated with the identification information or the like, in the magnetic disk 19 or 19-2. The decision section 111 or 111-2 may refer to the time indicated by the clock and the execution time conditions, such as the time zone, associated with the target file of the user's start request, and may decide whether or not to comply with the request depending on whether or not the time satisfies the execution time conditions. The current time information acquisition section is means for acquiring current time information indicating at least one of the current time, date, or day of the week, and may be a clock provided in the information processing device 10 or 10-2, or means for acquiring time from the outside (CPU, communication means, or the like). The execution time conditions are conditions concerning time necessary for executing the application program. The execution time conditions are information indicating the time zone, day of the week, and date in which the application program can be executed (or cannot be executed), for example. Business days and business hours of a company, school, or facility may be set as the execution time conditions.

After deciding that the file of the application program designated by the application start request has been registered in the application control information (S330 in FIG. 6 and S500 in FIG. 9), the decision section 111 or 111-2 decides whether or not to comply with the request based on the time indicated by the clock and the execution time conditions included in the application control information.

The start conditions can be more finely set by setting the time conditions in which each application program can be executed for each application program, such as preventing the information processing device 10 or 10-2 from being used in a period other than the business hours or in holidays, whereby security can be improved. Moreover, since the application control program (start request detection section 113) monitors the application program start request issued to the OS as described in the first and second embodiments, start of the application program can be easily controlled based on the execution time conditions.

In each embodiment, the information processing device 10 or 10-2 may be set so that the information processing device 10 or 10-2 does not limit start of the application program based on the application control information in a predetermined time zone. For example, when the administrator must manage a number of information processing devices 10 and 10-2, such as in a company, a necessary application program may be distributed and installed in each of the employee's information processing devices 10 and 10-2 from a predetermined terminal such as a management terminal (not shown) in a period from 9:00 to 10:00, and the application program may be executed by remote control. In this case, cross authentication is performed between the management terminal and each of the information processing devices 10 and 10-2 before installing and remote-controlling the application program.

Figure 12:
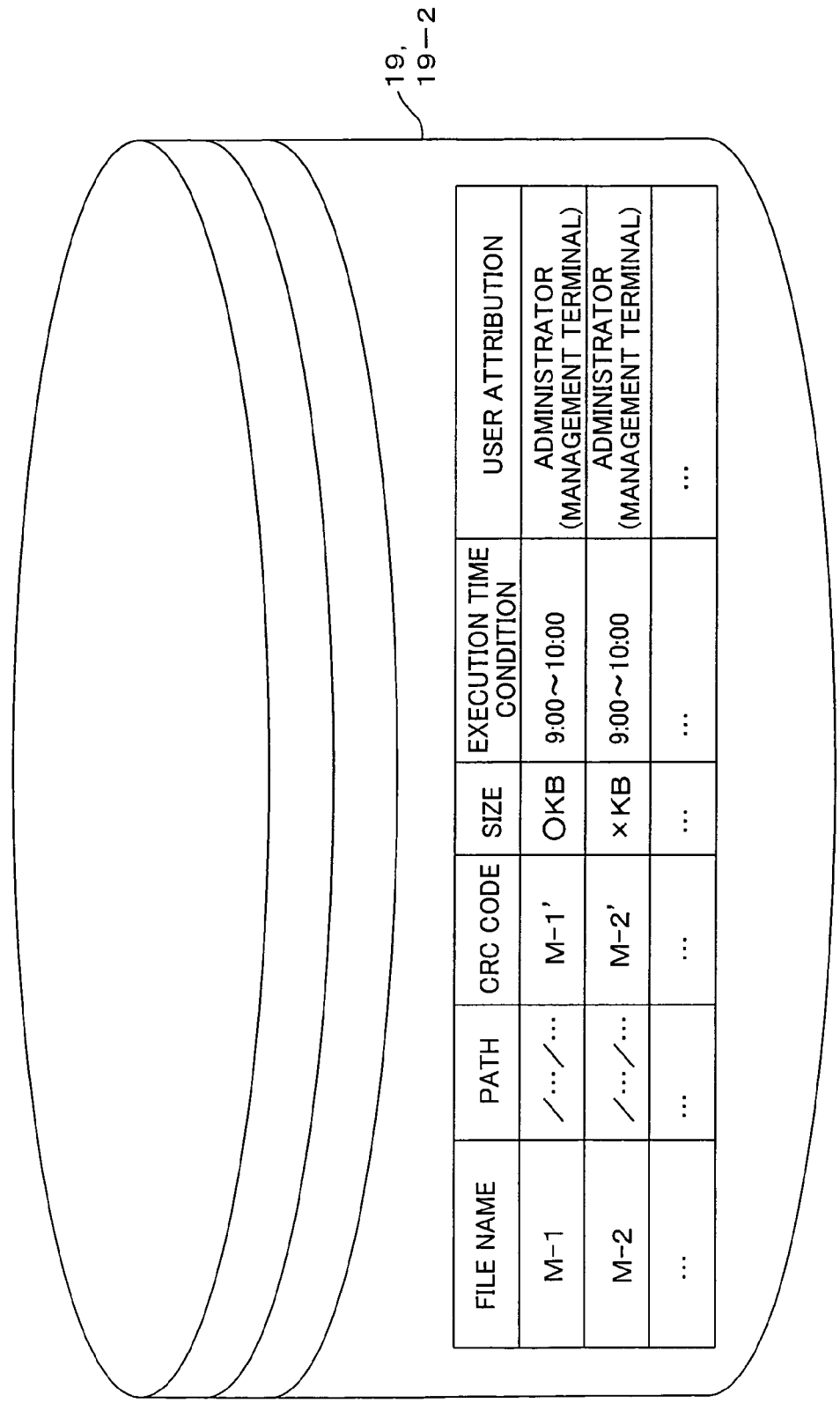
FIG. 12 is a diagram showing application control information stored in a magnetic disk 19 or 19-2 (modification).

When the user is the administrator who remote-controls the application program from the management terminal, the information processing device 10 or 10-2 may receive information for identifying a person who remote-controls the application program (or terminal which remote-controls the application program), which is the user identification information, from the management terminal, and may control start of the application program by referring to the application control information as shown in FIG. 12 stored in the magnetic disk 19 or 19-2 in which the identification information on each executable application program (file) is associated with the execution time conditions, user conditions, and the like.

This enables registration of various application programs available to each user or user's attribute, such as a management application program which can be executed by only the administrator, whereby convenience and security can be improved.

The invention claimed is:

1. An information processing device, comprising:
   executable application identification information storage means for storing executable application identification information including identification information and specific information on an executable application program;

execution permission decision means for deciding, when a start request for an application program has been issued, whether or not to permit start of the application program designated by the request based on the executable application identification information stored in the executable application identification information storage means; and identification information rewriting means for rewriting, when a predetermined change request has been issued from a user authenticated as a predetermined person, the executable application identification information stored in the executable application identification information storage means according to the request.

2. The information processing device as defined in claim 1, wherein the executable application identification information storage means stores the identification information on an executable application program of which start is permitted;

wherein the execution permission decision means does not permit start of an application program of which the identification information is not stored in the executable application identification information storage means.

3. The information processing device as defined in claim 1, comprising:

first initial setting means for performing an initial setting, when a predetermined initial setting request has been issued from a user authenticated as a predetermined person, by writing the executable application identification information into the executable application identification information storage means according to the request.

4. The information processing device as defined in claim 1, comprising:

measurement means for measuring execution frequency of each application program; and second initial setting means for performing an initial setting by writing the executable application identification information into the executable application identification information storage means based on a measurement result from the measurement means.

5. The information processing device as defined in claim 4, comprising:

setting reservation application identification information storage means;

wherein the second initial setting means writes the identification information on an application program with an execution frequency equal to or greater than a predetermined level into the executable application identification information storage means to allow the application program to be executable, and writes setting reservation application identification information including the identification information on an application program with a medium execution frequency level into the executable application identification information storage means to put the application program in a setting reservation state in which a predetermined person can select whether or not to permit start of the application program.

6. The information processing device as defined in claim 1, comprising:

application detection means for detecting a stored application program; and notification means for notifying a predetermined person whether or not the application program detected by the application detection means can be executed based on the executable application identification information stored in the executable application identification information storage means.

7. The information processing device as defined in claim 1, comprising:

current time information acquisition means for acquiring current time information indicating at least one of current time, date, and day of the week;

wherein the executable application identification information storage means stores the identification information on each executable application and corresponding execution time conditions while associating the identification information with the execution time conditions; and wherein, when a start request for an application program has been issued, the execution permission decision means decides whether or not to permit start of the application program designated by the request based on the current time information acquired by the current time information acquisition means and the execution time conditions corresponding to the request target application program.

8. The information processing device as defined in claim 1, wherein the executable application identification information storage means stores user conditions while associating the user conditions with the identification information on an executable application program;

wherein the information processing device includes user information input means for inputting user identification information and/or user attribute information from outside; and wherein, when a start request for an application program has been issued, the execution permission decision means decides whether or not to permit start of the application program designated by the request based on the user identification information and/or the user attribute information input by the user information input means and the user conditions corresponding to the request target application program.

9. An information processing system, comprising:

the information processing device as defined in claim 8; and a management device which includes user attribute information storage means for storing the user identification information and the user attribute information while associating the user identification information with the user attribute information, and communication means for communicating with the information processing device, and sends the user attribute information corresponding to the user identification information received from the information processing device;

wherein the information processing device includes transmission means for transmitting the user identification information input by the user information input means to the management device, and reception means for receiving the user attribute information corresponding to the user identification information transmitted by the transmission means from the management device; and wherein the execution permission decision means of the information processing device makes a decision based on the executable application identification information stored in the executable application identification information storage means and corresponding to the user attribute information received by the reception means.

10. An information processing system, comprising:

the information processing device as defined in claim 3; and an external device capable of communicating with the information processing device;

wherein the external device includes authentication information storage means for storing authentication information, and authentication decision means for deciding whether or not to authenticate the user of the information processing device as the predetermined person based on the authentication information; and wherein the information processing device performs processing in response to an initial setting request and/or a change request from the user when the authentication decision means of the external device has decided "YES".

11. A computer readable medium encoded with a program for execution by an information processing device including executable application identification information storage means for storing executable application identification including identification information on an executable application program and for performing processing according to an application program, the program comprising:

an execution permission decision procedure for deciding, when a start request for an application program has been issued, whether or not to permit start of the application program designated by the request based on the executable application identification information stored in the executable application identification information storage means; and an identification information rewriting procedure for rewriting, when a predetermined change request has been issued from a user authenticated as a predetermined person, the executable application identification information according to the request.

12. The computer-readable medium as defined in claim 11, wherein the program further comprises:

a first initial setting procedure for performing an initial setting, when a predetermined initial setting request has been issued from a user authenticated as a predetermined person, by writing executable application identification information into the executable application identification information storage means according to the request.

13. The computer-readable medium as defined in claim 11, wherein the program further comprises:

a measurement procedure for measuring execution frequency of each application program; and a second initial setting procedure for performing an initial setting by writing the executable application identification information into the executable application identification information storage means based on a measurement result from the measurement procedure.

14. The computer-readable medium as defined in claim 11, wherein the stored identification information includes setting information indicating whether or not the application program may be executed and wherein the identification information rewriting procedure rewrites the setting information.

15. The information processing device according to claim 1 wherein the stored identification information includes setting information indicating whether or not the application program may be executed and wherein the identification information rewriting means allows the authenticated user to rewrite the setting information.

* * * * *